July 18, 1933.  C. H. THAYER  1,918,723
CALCULATING DEVICE FOR USE WITH THREE-PHASE WATTMETERS
Filed March 20, 1933   2 Sheets-Sheet 1
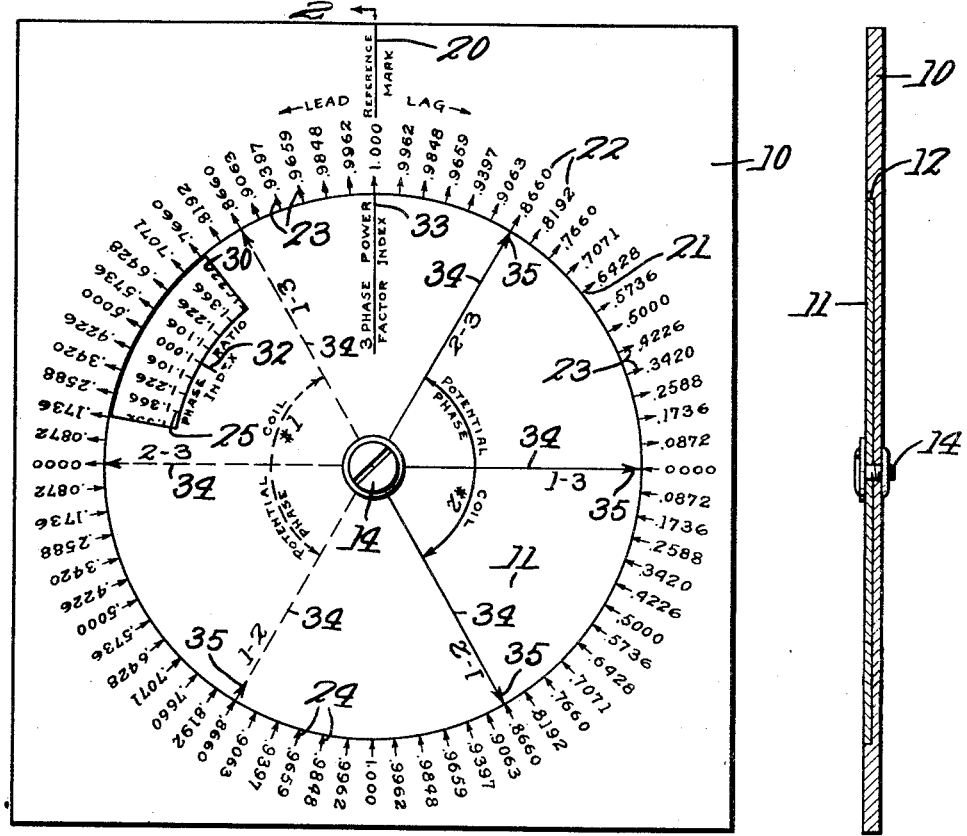
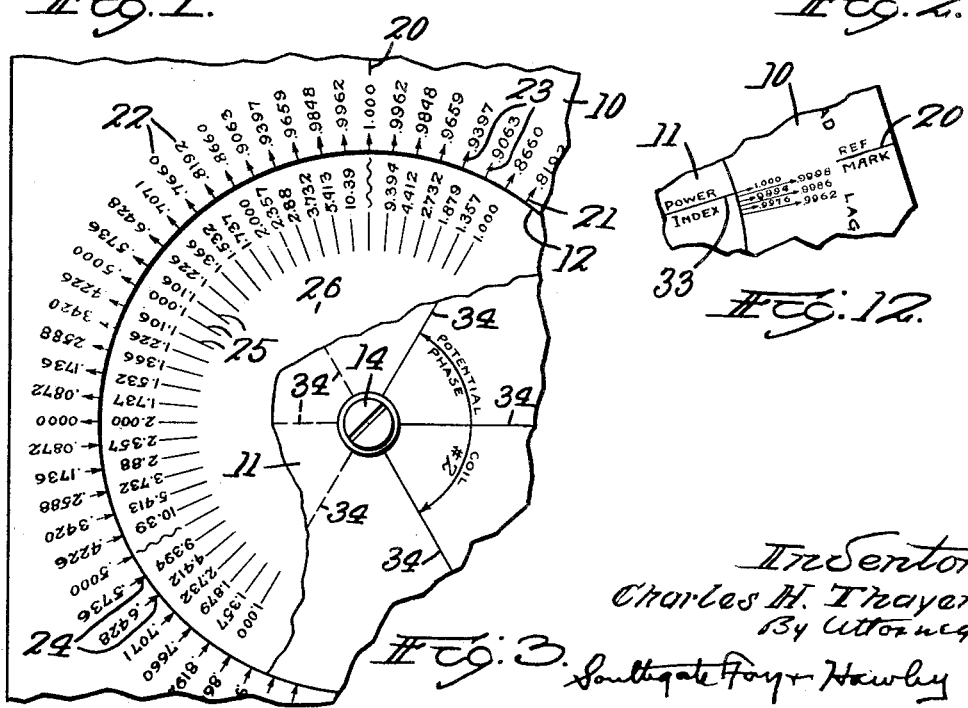
Inventor
Charles H. Thayer
By Attorneys
Southgate Hoyt + Hawley July 18, 1933.  C. H. THAYER  1,918,723
CALCULATING DEVICE FOR USE WITH THREE-PHASE WATTMETERS
Filed March 20, 1933  2 Sheets—Sheet 2
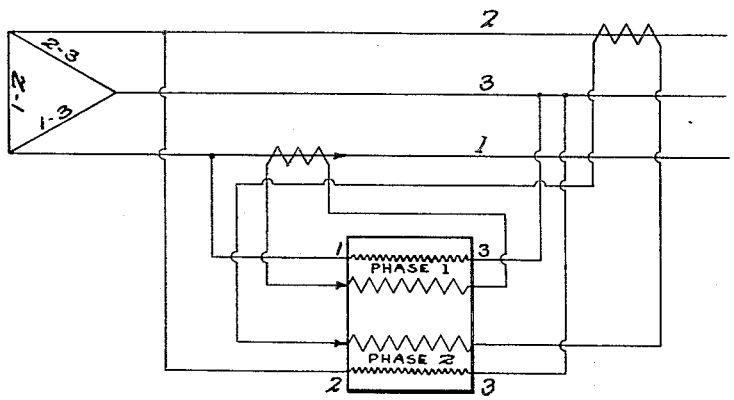
Fig. 4.
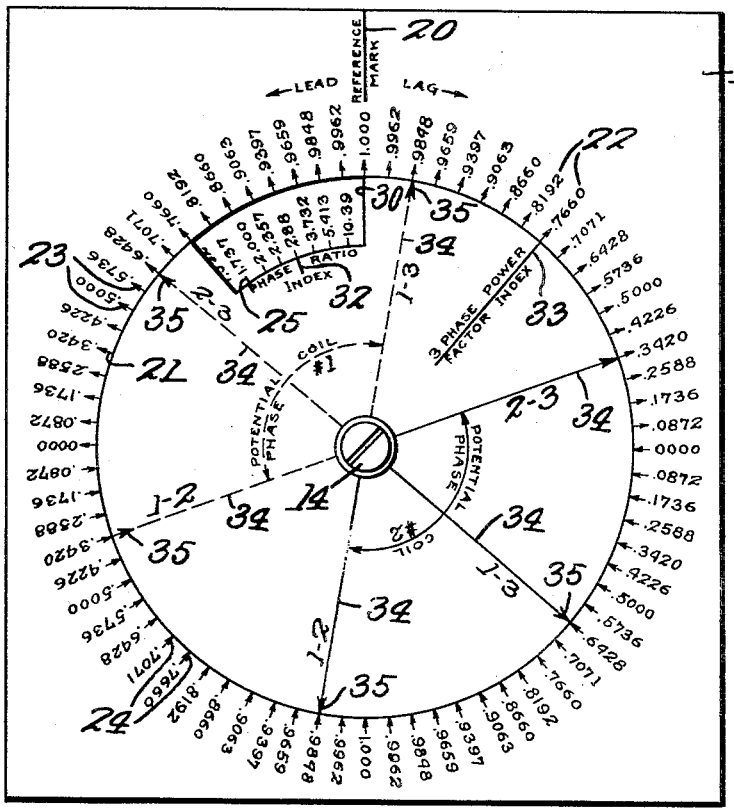
Fig. 5.
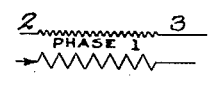
Fig. 6.
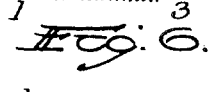
Fig. 7.
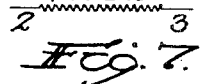
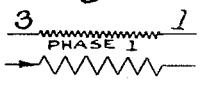
Fig. 8.
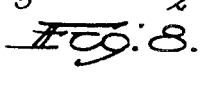
Fig. 9.  Fig. 10.  Fig. 11.
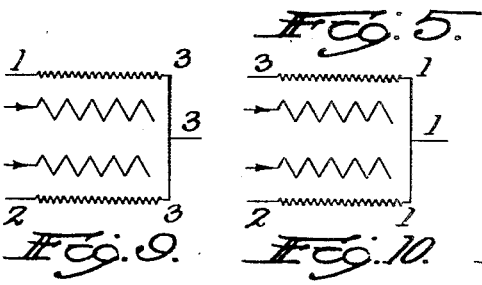
Inventor
Charles H. Thayer
By Attorneys
Southgate Fayer Hawley Patented July 18, 1933

1,918,723

UNITED STATES PATENT OFFICE

CHARLES HAROLD THAYER, OF ASHLAND, MASSACHUSETTS

CALCULATING DEVICE FOR USE WITH THREE-PHASE WATTMETERS

Application filed March 20, 1933. Serial No. 661,765.

This invention relates to a device by which various factors relating to the use of wattmeters may be quickly and easily determined.

The general object of the invention is to provide a device usable to determine a correction factor for the reading of a three-phase meter in which one or more terminals are wrongly connected. The device may also be used to demonstrate the correctness of certain rules as to wattmeter operation and is useful in other ways to persons employed in reading, testing or correcting wattmeters.

My invention further relates to arrangements and combinations of parts which will be hereinafter described and more particularly pointed out in the appended claims.

A preferred form of the invention is shown in the drawings, in which

Fig. 1 is a plan view of my improved calculating device;

Fig. 2 is a sectional side elevation thereof, taken along the line 2—2 in Fig. 1;

Fig. 3 is a partial plan view with a portion of the rotor broken away;

Fig. 4 is a diagram illustrating the correct connections of a three-phase wattmeter;

Fig. 5 is a view similar to Fig. 1 but showing the device set for solving a particular series of problems;

Figs. 6, 7 and 8 show variations in the connections of the four terminal wattmeter shown in Fig. 4;

Figs. 9, 10 and 11 show various connections of a three-terminal wattmeter, and

Fig. 12 shows a modified graduation of the scale on the stator.

Referring to Figs. 1 and 2, my improved calculating device is mechanically very simple and comprises a stationary part 10 which I have termed the "stator" and a rotatable part 11 which I have termed the "rotor". The rotor 11 is preferably mounted in a circular recess 12 in the stator 10, and these parts are secured together by a pivot stud 14 which is adjusted to cause the parts 10 and 11 to engage with sufficient friction so that they will not be accidentally relatively displaced but may nevertheless be manually adjusted.

The stator is provided with a reference mark 20 and is also provided with graduations 21 and scale readings 22 running from zero to one in each quarter. Certain of the graduations 21 have arrow-heads 23 pointing away from the periphery of the rotor, while other graduations 21 have arrow-heads 24 pointing toward the rotor. The words "lead" and "lag" also appear at each side of the reference mark 20, accompanied by suitable direction arrows.

The stator is also provided with a series of numerals on the bottom surface 26 (Fig. 3) of the recess 12 and with a series of graduations 25 associated with said numerals. The numerals and graduations extend around one-half of the circumference and the numerals for each quarter increase from one to about ten and decrease again to one, but the rates of increase and decrease are not in the same proportion.

The scales are so arranged that the graduation 2 is aligned with the graduation zero at the left of the stator and that a second graduation 2 is opposite the graduation .8660 in the upper left-hand or fourth quarter of the stator.

A portion of the rotor 11 is cut away as indicated at 30 (Fig. 1) so that the graduations 25 and associated numerals may be easily read with reference to a phase ratio index line 32 on the rotor.

The rotor is also provided with a three-phase power factor index line 33 and with a series of index lines 34 and directional arrows 35. The lines 34 shown as full lines relate to the connections of the potential coil associated with the phase #2 current coil, and the lines 34 shown as broken lines relate to the connections of the potential coil associated with the phase #1 current coil. The lines in each group are further designated as "1—2", "1—3" and "2—3", the numerals indicating the potential coil terminals as appearing and numbered in Fig. 4.

For convenience, I have shown the graduations and numerals on the stator at five degree intervals but it will be understood that closer graduations may be provided by increasing the size of the device or by staggering the numerals as shown in Fig. 12.

The arrows 24 on the stator 10 have reference to the current coil connections and the arrows 35 on the rotor index lines have reference to the potential coil connections.

The outer scale readings 22 on the stator are the cosines of the angles by which the current in an element of the meter leads or lags with respect to its voltage. The inner scale readings 25 on the stator, forming the phase ratio index, are obtained by dividing the watts in the phase having the greater reading by the watts in the phase having the less reading for each value of the three-phase power factor and with the meter properly connected.

Having described the details of construction of my improved calculating device, I will now describe the use and utility thereof. If the three-phase power factor index is not known, it can be readily determined with respect to a meter properly connected as shown in Fig. 4.

To determine the three-phase power factor, a watt-meter is connected on phase #2 and allowed to run for a predetermined time, after which the reading is noted and the wattmeter is allowed to run for the same length of time on phase #1.

Assuming that the reading on phase #2 was 400 and on phase #1 was 1152 and that the meter element moved in a positive direction in each case, indicating that the three-phase power factor is above 0.500, I divide the greater reading by the less and obtain the reading of 2.88. I now set the calculator so that the numeral 2.88 appears in the opening 30 opposite the phase ratio index line 32.

Reference to Fig. 3 will show that the numeral 2.88 appears twice on the phase ratio scale. That reading will be selected which brings the three-phase factor index 33 opposite a reading which is lagging rather than leading, as the three-phase circuit is assumed to be lagging and also opposite a reading which is more than .500.

I now observe that the three-phase power factor index 33 points to the numeral .766 (Fig. 5) which is accordingly the correct three-phase power factor index for the meter in question, it being assumed that the load is balanced. This number being to the right of the reference mark 20 indicates that the power factor index is lagging rather than leading.

Having obtained the correct setting of the device with reference to the three-phase power factor index, I am now in a position to determine the separate power factors for the first and second phases respectively.

As I have assumed that the connections are as shown in Fig. 4, I make use of the single full index line "2—3" corresponding to the connections of phase #2 potential coil in Fig. 4, and find that this line points to the numeral .3420, with the arrow on the index line "2—3" pointing in the same direction as the arrow on the stator, this latter fact indicating that the reading is positive. This accordingly is the power factor for the second phase and being in the first quarter, the power factor is lagging.

Similarly I select the broken index line marked "1—3" corresponding to the connections of phase #1 potential coil in Fig. 4 and find that this index line indicates the numeral .9848, with the arrows in the same direction, so that the power factor for the first phase is also positive and being in the first quarter is also lagging. The algebraic sum of these power factors being both positive is 1.3268, a value to which reference will be made later.

I will now describe the use of my device for determining a correction factor when a meter is incorrectly connected. For example, I will take a case where the potential coil of phase #2 is reversed but the connections are otherwise correct. In this case I would use the full index line on the rotor which is marked "2—3" but as the potential is reversed, I would consider the arrow on the line "2—3" as also reversed.

Assuming the three-phase power factor index as .766, the index line "2—3" will still point to the number .3420, but as the arrows point in opposite directions, the reading is negative. The reading for phase #1 remains the same as in the previous example, namely .9848, and the algebraic sum of —.3420 and .9848 is .6428.

Comparing this with the algebraic sum with the meter correctly connected, which was previously found to be 1.3268, I find that the ratio is 2.06. This, therefore, is the multiplying constant by which the incorrect reading, taken with the phase #2 potential coil reversed, must be multiplied to give the actual reading which would have been registered by the meter if correctly connected.

This ratio is correct for the power factor .766 and a balanced load, but would of course be different for any other power factor.

In the same manner, other incorrect connections can be analyzed and a multiplying constant can be determined, so that the correct meter reading may be obtained regardless of the fact that the meter may have been running with any one of numerous possible incorrect arrangements of connections.

In Figs. 6, 7 and 8 examples are given of certain incorrect hook-ups and these examples may be multiplied, as there are thirty-six different arrangements in which a three-phase four-terminal wattmeter may be connected, of which the arrangement shown in Fig. 4 is correct and the arrangement shown in Fig. 8 is also correct if both current coils are reversed. For all of the other arrangements, a correction factor must be determined as previously explained.

In this connection, I have prepared a table showing the different possible connections of the potential coils and also showing the index lines and the reversal of rotor arrows to be used in determining the correction factor.

It will be noted that where both ends of a potential coil are incorrectly connected to the same line wire, the power for that phase becomes zero and that where a potential coil is reversed, the corresponding index line will be read with the arrow appearing thereon assumed to be reversed.

The table of possible combinations, together with the rotor index lines corresponding thereto, is as follows:

*Table for use with four voltage terminals*

| Item | Potential coil connections | | Corresponding rotor index lines | |
|---|---|---|---|---|
| | Phase #1 | Phase #2 | Phase #1 (Broken lines) | Phase #2 (Full lines) |
| 1 | 1—1 | 2—3 | zero | 2—3 |
| 2 | 1—1 | 3—2 | zero | 2—3* |
| 3 | 2—2 | 1—3 | zero | 1—3 |
| 4 | 2—2 | 3—1 | zero | 1—3* |
| 5 | 3—3 | 1—2 | zero | 1—2 |
| 6 | 3—3 | 2—1 | zero | 1—2* |
| 7 | 1—2 | 3—3 | 1—2 | zero |
| 8 | 1—2 | 1—3 | 1—2 | 1—3 |
| 9 | 1—2 | 3—1 | 1—2 | 1—3* |
| 10 | 1—2 | 2—3 | 1—2 | 2—3 |
| 11 | 1—2 | 3—2 | 1—2 | 2—3* |
| 12 | 1—3 | 2—2 | 1—3 | zero |
| 13 | 1—3 | 1—2 | 1—3 | 1—2 |
| 14 | 1—3 | 2—1 | 1—3 | 1—2* |
| 15 | 1—3 | 2—3 | 1—3 | 2—3 |
| 16 | 1—3 | 3—2 | 1—3 | 2—3* |
| 17 | 2—1 | 3—3 | 1—2* | zero |
| 18 | 2—1 | 1—3 | 1—2* | 1—3 |
| 19 | 2—1 | 3—1 | 1—2* | 1—3* |
| 20 | 2—1 | 2—3 | 1—2* | 2—3 |
| 21 | 2—1 | 3—2 | 1—2* | 2—3* |
| 22 | 3—1 | 2—2 | 1—3* | zero |
| 23 | 3—1 | 1—2 | 1—3* | 1—2 |
| 24 | 3—1 | 2—1 | 1—3* | 1—2* |
| 25 | 3—1 | 2—3 | 1—3* | 2—3 |
| 26 | 3—1 | 3—2 | 1—3* | 2—3* |
| 27 | 2—3 | 1—1 | 2—3 | zero |
| 28 | 2—3 | 1—2 | 2—3 | 1—2 |
| 29 | 2—3 | 1—3 | 2—3 | 1—3 |
| 30 | 2—3 | 2—1 | 2—3 | 1—2* |
| 31 | 2—3 | 3—1 | 2—3 | 1—3* |
| 32 | 3—2 | 1—1 | 2—3* | zero |
| 33 | 3—2 | 1—2 | 2—3* | 1—2 |
| 34 | 3—2 | 1—3 | 2—3 | 1—3 |
| 35 | 3—2 | 2—1 | 2—3 | 1—2* |
| 36 | 3—2 | 3—1 | 2—3* | 1—3* |

*Reverse arrow on rotor.

Certain facts as to the meter connections can also be determined by comparison of readings taken under different conditions. Take for instance the meter connections show in Fig. 4 and assume that the potential coil connections are interchanged, as indicated in Fig. 6. Assume also that the three-phase power factor is .7660 and that the setting of the calculator is as shown in Fig. 5. Then the corresponding rotor index line for phase #1 is the dotted line "2—3" and the reading is .6428 with the arrows pointing in the same direction so that the reading is positive.

The index line for phase #2 is the full line "1—3" which points to the numeral .6428 but with the arrows reversed indicating that the reading is negative. Consequently the algebraic sum of the two readings is zero and if the load is balanced, the meter will stop. This shows that if a meter stops when the potential terminals 1 and 2 are interchanged, then the meter was previously correctly connected.

Applying the same tests to a meter correctly connected but with one current coil reversed, the results before and after interchange of voltage wires would be as follows, assuming the three-phase power factor as .7660.

With the correct connections as shown in Fig. 4 but with the current coil of phase #2 reversed, the broken index line "1—3" for phase #1 would indicate the numeral .9848 and as both arrows point in the same direction, the reading is positive.

The full index line "2—3" for the phase #2 indicates the numeral .3420 but as the current is reversed in the second phase, the arrow on the stator opposite the line "2—3" is assumed to be correspondingly reversed, so that the arrows point in opposite directions and the reading is negative. The algebraic sum is accordingly .6248.

If the voltage connections 1 and 2 are now interchanged, the broken line "2—3" for phase #1 gives the positive reading .6428 and the full line "1—3" for phase #2 gives the reading .6428 but as the current coil for phase #2 is reversed, the arrow on the stator opposite the line "1—3" is assumed to be correspondingly reversed, so that the two arrows point in the same direction and this reading also is positive.

The algebraic sum of these two readings is 1.2856, which is twice that of the reading before the voltage connections were interchanged and the meter speed will be correspondingly increased. Consequently if the voltage connections 1 and 2 are interchanged, an increase in meter speed is noted; this indicates that the original voltage connections 1 and 2 were correct but that a current coil in the meter is reversed.

As a final example, take the case where the voltage connections 1 and 2 are interchanged and the phase #2 current coil is also reversed. Under these conditions, I use the broken line "2—3" for phase #1, giving the reading .6428, with both arrows pointing in the same direction and the reading positive. I also use the full line "1—3" for phase #2, giving the reading .6428, and as the current coil in phase #2 is assumed to be reversed, the arrow on the stator opposite the index line "1—3" is also assumed to be correspondingly reversed, so that both arrows point in the same direction and this reading is positive, the sum of the readings being 1.2856.

If I now interchange the voltage connections 1 and 2 so that they are correct as shown in Fig. 4, the broken rotor index line "1—3" will be used for phase #1, giving the positive reading .9848, and the full line "2—3" will be used for phase #2, with the arrow on the stator assumed to be reversed on account of the assumed reversal of the current coil for phase #2. The arrows accordingly point in opposite directions, giving the negative reading .3420. The algebraic sum of these readings is .6248, which is one-half of the reading previously obtained.

Accordingly, if an interchange of voltage wires 1 and 2 causes the meter to run in the same direction but at reduced speed, this indicates that the original voltage connections were wrong and furthermore that one current coil is reversed.

From these illustrations, it is believed that the manifold uses of my calculating device will be indicated and that it will be evident that a person skilled in the art can use this device for the solution of very many problems relating to the connecting, testing and reading of three-phase meters.

Where a three-phase meter is provided with three voltage terminals only instead of four, the possible voltage combinations are reduced to six as shown by the following table, which corresponds in utility to the table previously given for use with four-voltage terminals.

*Table for use with three voltage terminals*

| | Potential coil connections. | | Corresponding rotor index lines. | |
|---|---|---|---|---|
| Item | Phase #1 | Phase #2 | Phase #1 (Broken lines) | Phase #2 (Full lines) |
| 1 | 1—3 | 2—3 | 1—3 | 2—3 |
| 2 | 3—1 | 2—1 | 1—3* | 1—2* |
| 3 | 1—2 | 3—2 | 1—2 | 2—3* |
| 4 | 2—1 | 3—1 | 1—2* | 1—3* |
| 5 | 2—3 | 1—3 | 2—3 | 1—3 |
| 6 | 3—2 | 1—2 | 2—3* | 1—2 |

* Reverse arrow on rotor.

Figs. 9, 10 and 11 show various possible combinations for the three terminal meter, the connections shown in Fig. 9 being correct.

Having thus described my invention and the advantages thereof, I do not wish to be limited to the details herein disclosed, otherwise than as set forth in the claims, but what I claim is:—

1. A calculating device for use with three-phase wattmeters comprising a stator, and a rotor mounted thereon and pivoted thereto, said stator having delineated thereon a reference mark and a circular ratio scale reading from zero to one in each quarter, and said rotor having delineated thereon a three-phase power factor index and a series of index lines marked to indicate selected wattmeter terminal connections, said index lines being in predetermined angular relation to said three-phase power factor index and each index line cooperating with said circular ratio scale to indicate the power factor in the phase which said index line represents.

2. A calculating device for use with three-phase wattmeters comprising a stator, and a rotor mounted thereon and pivoted thereto, said stator having delineated thereon a reference mark and a circular ratio scale reading from zero to one in each quarter, with the ratios in adjacent quarters increasing in opposite directions and said rotor having delineated thereon a three-phase power factor index and a series of index lines marked to indicate selected wattmeter terminal connections, said index lines being in predetermined angular relation to said three-phase power factor index, and each index line cooperating with said circular ratio scale to indicate the power factor in the phase which said index line represents.

3. A calculating device for use with three-phase wattmeters comprising a stator, and a rotor mounted thereon and pivoted thereto, said stator having delineated thereon a reference mark and a circular ratio scale reading from zero to one in each quarter, and said rotor having delineated thereon a three-phase power factor index and a series of index lines marked to indicate selected wattmeter terminal connections, said index lines being in predetermined angular relation to said three-phase power factor index and each index line cooperating with said circular ratio scale to indicate the power factor in the phase which said index line represents, one-half of said index lines being marked to indicate terminal connections in one phase and the other half of said index lines being marked to represent terminal connections in another phase.

4. A calculating device for use with three-phase wattmeters comprising a stator, and a rotor mounted thereon and pivoted thereto, said stator having delineated thereon a reference mark and a circular ratio scale reading from zero to one in each quarter, and said rotor having delineated thereon a three-phase power factor index and a series of index lines marked to indicate selected wattmeter terminal connections, said index lines being in predetermined angular relation to said three-phase power factor index and each index line cooperating with said circular ratio scale to indicate the power factor in the phase which said index line represents, said ratio scale comprising the cosines of the angles by which the current in a selected meter element leads or lags with respect to its voltage for different three-phase power factors.

5. A calculating device for use with three-phase wattmeters comprising a stator, and a rotor mounted thereon and pivoted thereto, said stator having delineated thereon a reference mark and a circular ratio scale reading from zero to one in each quarter, with the ratios in adjacent quarters increasing in opposite directions and said rotor having delineated thereon a three-phase power factor index and a series of equally spaced index lines marked to indicate selected wattmeter terminal connections, said index lines being in predetermined angular relation to said three-phase power factor index and each index line cooperating with said circular ratio scale to indicate the power factor in the phase which said index line represents, said circular ratio scale having arrows associated with the scale readings and pointing inward in two adjacent quarters and outward in the other two adjacent quarters, and said index lines having arrows associated therewith, some of which point inward and others outward, the association of arrows pointing in the same direction on an index line and an adjacent point on the ratio scale indicating a positive reading, and the association of arrows pointing in opposite directions indicating a negative reading.

6. A calculating device as set forth in claim 1, in which the stator has delineated thereon a second circular scale representing phase ratios and in which said rotor has a portion cut away to uncover a part of said phase ratio scale and is provided with a phase ratio index at said cut away portion, indicating a selected reading on said phase ratio scale.

7. A calculating device as set forth in claim 1, in which the stator has delineated thereon a second circular scale representing phase ratios and in which said rotor has a portion cut away to uncover a part of said phase ratio scale and is provided with a phase ratio index at said cut away portion, indicating a selected reading on said phase ratio scale, said phase ratio index being in predetermined and fixed angular relation to said three-phase power factor index.

CHARLES HAROLD THAYER.